Feb. 28, 1961 T. S. KULKA 2,973,159

FRICTION REDUCING TAPE REEL

Filed Aug. 17, 1959

INVENTOR
THOMAS S. KULKA

BY Alman S. Nelson
ATTORNEY

United States Patent Office 2,973,159

Patented Feb. 28, 1961

2,973,159

FRICTION REDUCING TAPE REEL

Thomas S. Kulka, 200 Film Bldg., 2108 Payne Ave., Cleveland, Ohio

Filed Aug. 17, 1959, Ser. No. 834,166

2 Claims. (Cl. 242—71.8)

This invention relates to winding and reeling and more particularly to a reel for use with tape, such as that commonly used in the magnetic recording of sound and in which the reel is provided with means for reducing friction between the edges of the tape and the inner surfaces of the flanges of the reel.

In the use of sound recording and play back apparatus of the type utilizing magnetic tape wound on reels, considerable difficulty has been experienced due to the friction between the edges of the tape and the inner surfaces of the flanges of the reel. This is particularly troublesome in reels of larger diameters and the situation is further aggravated by the fact that frequently the flanges are somewhat distorted thereby providing a non-uniform frictional engagement between the inner surfaces of the reel flanges and the edges of the tape. As a result, the quality of the sound recording or reproduction has been adversely affected and in certain extreme cases the friction between the flanges and the tape may be sufficient to cause breakage of the tape.

It is accordingly an object of the invention to provide a tape reel incorporating means for reducing and maintaining at a minimum friction between the edges of the tape and the inner surfaces of the flanges of the reel.

A further object of the invention is the provision of a friction reducing tape reel which may be conveniently and economically manufactured by conventional molding methods and in any desired sizes.

A still further object of the invention is the provision of a friction reducing tape reel in which means is provided on the inner surfaces of the flanges of the reel to reduce the area of contact between the edges of the tape and the inner surfaces of such flanges.

Another object of the invention is the provision of a friction reducing tape reel in which the friction reducing means provided on the flanges of the reel is effective, even though the flanges may be distorted.

Figure 2:
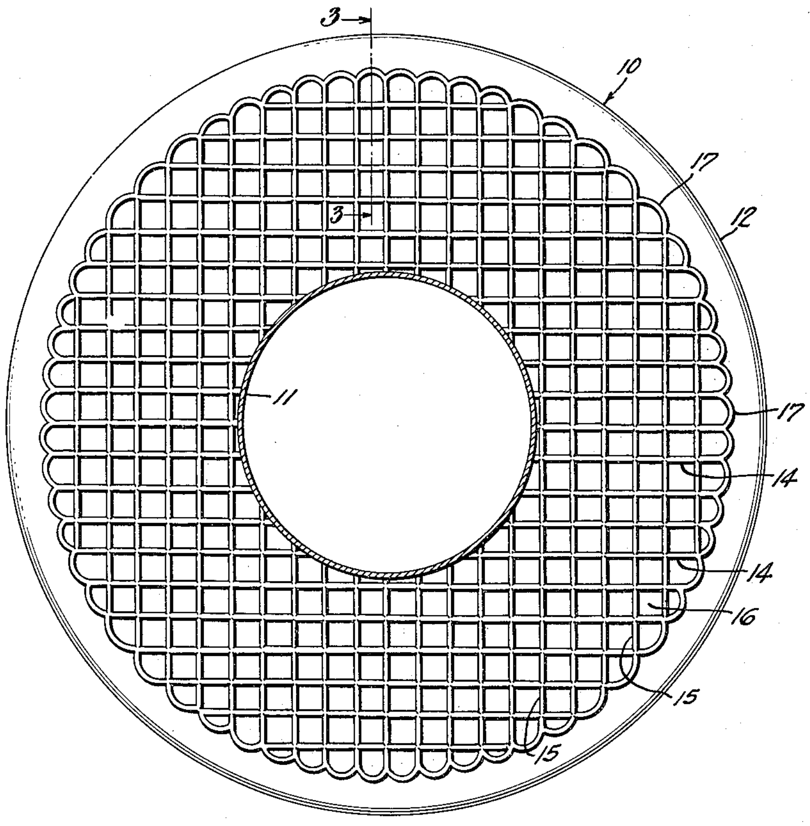
Figure 1:
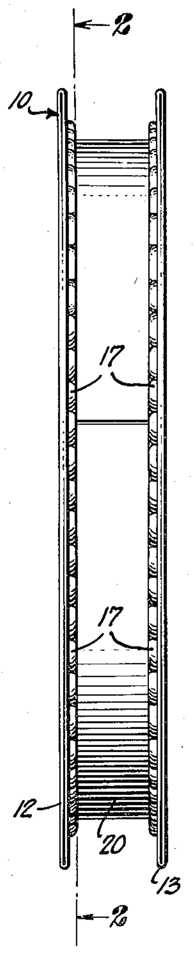
Figure 3:
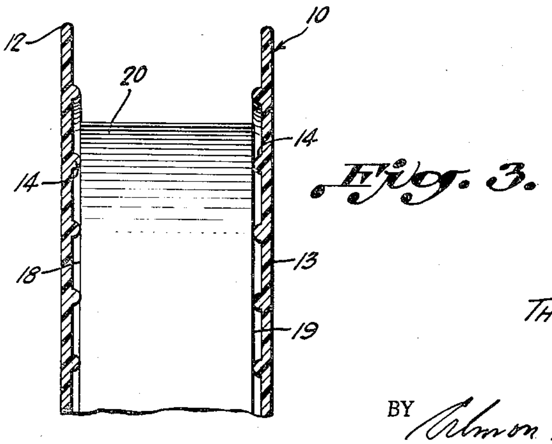

Further objects and advantages of the invention will be apparent from the following description taken in conjunction with the accompanying drawing wherein:

Fig. 1 is a side elevational view of a friction reducing tape reel constructed in accordance with this invention;

Fig. 2 a sectional view taken substantially on the line 2—2 of Fig. 1 and showing the formation of the inner surface of one of the flanges of the reel; and Fig. 3 a fragmentary sectional view to an enlarged scale and taken substantially on the line 3—3 of Fig. 2 showing the engagement between the edges of tape and the ribs provided on the inner surfaces of the reel flanges.

With continued reference to the drawing, there is shown a friction reducing tape reel 10 constructed in accordance with this invention and which may well comprise a hub 11 provided with spaced radially outward extending flanges 12 and 13 from hub 11. The reel 10 may be molded of plastic or other suitable materials in a conventional manner and hub 11 may be of a standard diameter to be received on conventional magnetic recording or play back apparatus and the flanges 12 and 13 may be of a suitable diameter to provide a reel of the desired capacity.

Since the inner surfaces of the flanges 12 and 13 are identical, a description of one flange will suffice and with particular reference to Fig. 2, it will be seen that the inner surface of flange 12 is provided with a plurality of inwardly projecting spaced parallel ribs 14 of generally arcuate section and with a plurality of spaced parallel inwardly projecting similar ribs 15 extending at right angles to the ribs 14 and intersecting the same to provide a plurality of inwardly opening rectangular recesses 16 between the ribs. The ribs 14 and 15 are connected at their outer ends by arcuate ribs 17 and it is to be noted that the arcuate ribs 17 are spaced radially inwardly from the peripheral edge of the flange 12 and as a result, the arcuate ribs 17 provide a scalloped outer edge for the ribs 14 and 15. As clearly seen in Fig. 2, the ribs 14 and 15 provide a criss-cross or waffle-like embossed pattern which intersects with and extends radially outward from hub 11 and such ribs present inwardly directed peaks which serve to lightly engage the side edges 18 and 19 of the tape 20 when wound on the hub 11 of the reel 10. As tape 20 is wound onto reel 10, any dust or other foreign matter adhering to tape edges 18 and 19 will wipe off by this light engagement of the tape edges with the inwardly directed peaks of ribs 14, 15. Recesses 16 thus provide repository spaces for such wiped off material.

Fig. 3 clearly shows the light engagement of the edges 18 and 19 of the tape 20 with the peaks of the ribs 14 and, of course, a similar engagement will exist between the edges 18 and 19 of the tape 20 and the peaks of the ribs 15. In this manner, the area of contact between the edges 18 and 19 of the tape 20 and the inner surfaces of the flanges 12 and 13 will be materially reduced in comparison with that obtaining were the inner surfaces of flanges flat and in contact throughout with the tape edges. By the provision of the ribs 14, 15 the friction between the tape 20 and the flanges 12 and 13 is reduced and maintained at a minimum.

While the ribs 14 and 15 have been shown disposed at right angles to provide rectangular inwardly opening recesses 16, it is to be understood that if desired, such ribs may be disposed at other angles, in which case the recesses 16 may be other than rectangular. The scalloped edge provided by the arcuate rib 17 is provided for affording a smooth feed of the tape to and from the reel 10 and obviously, if desired, the connecting ribs at the end of the ribs 14 and 15 may be of other shapes or may, in certain instances, be entirely omitted and in case such arcuate ribs 17 are omitted, it might well be desirable to bevel the outer ends of the ribs 14 and 15 in order to provide for smooth movement of the tape onto the reel 10.

As set forth above, the ribs 14 and 15 are normally provided on the inner surfaces of both flanges 12 and 13 but in certain applications or uses it has been found sufficient under certain conditions to provide the ribs on the inner surface of one flange only.

It will be seen that by the above described invention, there has been provided a relatively simple manner of reducing the friction between the edges of a tape wound on a reel and the flanges of the reel and such reel may be conveniently and economically formed by conventional molding operations without materially increasing the cost thereof when compared to conventional reels having flanges with smooth inner surfaces.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A friction reducing tape reel comprising a hub, spaced radial extending flanges on said hub and inwardly projecting ribs disposed on the inner surface of each flange, said ribs intersecting at right angles to provide a criss-cross pattern providing rectangular recesses between the ribs, said criss-cross pattern intersecting with and extending outwardly from said hub, said ribs being connected at their outer ends remote from said hub by arcuate ribs to provide a scalloped edge radially inwardly of the outer edges of said flanges, whereby the side edges of tape wound on said hub between said flanges will lightly and continuously engage the peaks of said ribs to maintain a minimum of friction between the tape and said flanges.

2. A friction reducing tape reel comprising a hub, spaced radially extending flanges on said hub and inwardly projecting ribs disposed on the inner surface of each flange, said ribs intersecting to provide a criss-cross pattern providing recesses between the ribs, said criss-cross pattern intersecting with and extending outwardly from said hub, said ribs being connected at their outer ends remote from said hub by arcuate ribs to provide a scalloped edge radially inwardly of the outer edges of said flanges, whereby the side edges of tape wound on said hub between said flanges will lightly and continuously engage the peaks of said ribs to maintain a minimum of friction between the tape and said flanges.

References Cited in the file of this patent

UNITED STATES PATENTS

| | | |
|---|---|---|
| 1,417,313 | Gammeter | May 23, 1922 |
| 1,840,822 | Ross | Jan. 12, 1932 |
| 2,195,268 | Cazes | Mar. 26, 1940 |